Patented Dec. 12, 1950

2,533,938

UNITED STATES PATENT OFFICE 2,533,938

ESTERS OF ALIPHATIC MONOCARBOXYLIC ACIDS AND POLYBUTADIENE ALCOHOLS AND METHOD FOR PREPARING THE SAME

Edward Levant Jenner, Wilmington, Del., assignor to E. I. du Pont de Nemours & Company, Wilmington, Del., a corporation of Delaware No Drawing. Application October 2, 1947, Serial No. 777,591

19 Claims. (Cl. 260—488)

This invention relates to the preparation of esters and more particularly to the preparation of esters of higher alcohols.

When conjugated diene hydrocarbons are treated with sulfuric acid, any reaction that takes place usually does so by polymerization of unsaturated material or by addition reactions of the acid to the double bond. When organic acids are used, the reaction that usually takes place is simple addition of acid to unsaturated compound in equimolar ratios to produce simple esters. A combination of the two reagents has in some cases given hydrocarbons as the principal new product. For example, Farmer and Pitkethly (J. Chem. Soc., 1938, 11) mention that cyclic hydrocarbon products are obtained when methyl or dimethyl substituted butadienes are treated with sulfuric acid and acetic acid.

This invention has as an object the preparation of new esters. A further object is the provision of a process whereby esters are obtained from conjugated dienes which esters contain a plurality of units corresponding to the diene. Other objects will appear hereinafter.

These objects are accomplished by the following reaction wherein a hydrogen-containing conjugated diene preferably hydrocarbon and preferably having 4 to 6 carbons, and still more preferably having the unsaturation on terminal methylene groups, is brought into contact under anhydrous conditions with a carboxylic acid preferably of not more than two carboxyls, preferably, except for carboxyl, hydrocarbon, preferably liquid at 40° C. and preferably an aliphatic hydrocarbon monocarboxylic acid of one to six carbons, in the presence of perchloric acid whereby there are obtained esters of the carboxylic acid having in the alcohol radical a plurality of units corresponding to the diene, i. e., having in the alcohol radical a number of carbons equal to a multiple of the number of carbons in the diene.

In general, the process of this invention may be carried out by reacting the diene, e. g., butadiene, with the carboxylic acid, e. g., acetic or propionic acid, in the presence of minor amounts of perchloric acid for usually 2 to 50 hours at approximately 20–50° C. under anhydrous conditions. The carboxylic acid esters thus produced are purified by distillation from the reaction mixture or isolated by removal of unreacted acid and diene present. The products obtained are esters of the acid in which carboxyl hydrogen is replaced by a monovalent radical containing, in addition to one hydrogen, the components of a plurality of usually from 2 to 4, and possibly as many as 10, molecules of the diene. The esters from the preferred aliphatic carboxylic acids have the empirical formula $H(Y)_nOOCR$, in which Y is a divalent radical having the empirical composition of the diene, $n$ is a plural integer usually 2 to 4, and RCO is an acyl radical.

The following examples in which parts are by weight and degrees are centigrade are illustrative of the invention.

Example I

To 440 parts of glacial acetic acid was added 13.4 parts of 70% aqueous perchloric acid and 25 parts of acetic anhydride. The mixture was cooled in an ice bath and 90 parts of butadiene, at approximately −60° C., was added. The reaction was conducted in a loosely stoppered flask to permit the escape of butadiene as necessary. The mixture was allowed to warm to 25° C. and remain at that temperature for 15 hours. By this time it had become deep red. Approximately 200 parts of sodium hydroxide was then added as a 48% aqueous solution. The product was extracted with ether and the extract dried over magnesium sulfate. Following the distillation of the ether the residue (79 parts) was distilled under reduced pressure, whereupon the following fractions were obtained.

| Fraction | Parts | Boiling Point |
|---|---|---|
| Ether, etc | 10 | Condensed in Dry-Ice trap. |
| $C_4$-Acetates | 24.4 | ca. 28°/9 mm. |
| $C_8$-Acetates | 15.0 | ca. 54°/0.3 mm. |
| $C_{12}$-Acetates | 5.1 | ca. 90°/0.3 mm. |
| High molecular weight products | 24.0 | Residue (>90°/0.3 mm.) |

The saponification equivalent of the $C_8$-acetate fraction was obtained. Calc'd for $H(C_4H_6)_2$-$OCOCH_3$: 168.2. Found: 189.4.

Example II

A 2% solution of perchloric acid in acetic acid was prepared by adding 56 parts of 70% aqueous perchloric acid and 160 parts of acetic anhydride (to react with the water in the aqueous perchloric acid) to 1800 parts of glacial acetic acid. This solution was cooled to 10° C. and 343 parts of butadiene (temperature about −60° C.) was added. The reaction system was closed and the temperature raised to 25° C. where it was held for five hours. The mixture changed from yellow through orange to red. The maximum pressure reached in the system was approximately 1300 mm. of mercury. A solution of 42 parts of anhydrous potassium acetate dissolved in 190 parts of glacial acetic acid was added. The potassium perchlorate which precipitated was removed by filtration and the acetic acid solution was subjected to distillation at 65 mm. pressure to remove the acetic acid and the acetates of 4-carbon alcohols. In this process 190 parts of butadiene was recovered. The product from this reaction was combined with those from five duplicate runs, so that the total represented an initial charge of 2060 parts of butadiene of which 1140 parts was recovered. The product was then distilled through a 10-inch Vigreux column at reduced pressure, whereupon, the following fractions were obtained:

| Fraction | Parts | Boiling Point |
|---|---|---|
| $C_8$-acetates, $H(C_4H_6)_2OCOCH_3$ | 239 | 70°/6 mm. to 98°/1 mm. |
| $C_{12}$-acetates, $H(C_4H_6)_3OCOCH_3$ | 175 | 110–147°/1 mm. |
| Acetates of alcohols of more than 12 carbons. | 226 | Residue (>147°/1 mm.) |

The $C_8$-acetate fraction which comprises 37% of the total product was subjected to precision distillation, whereupon two major fractions were obtained. The first, obtained in lesser amount (29 parts), boiled at 63°/5 mm., $n_D^{25}$ 1.4388, and was the acetate of a diethylenically unsaturated 8-carbon alcohol. A sample of the alcohol obtained by this process was hydrogenated and subsequently hydrolyzed to yield a saturated octyl alcohol having the properties of octanol-3. The second fraction, constituting the major product (65 parts), boiled at 81°/5 mm., $n_D^{25}$ 1.4492. It is also the acetate of a diethylenically unsaturated 8-carbon alcohol and has the following analysis. Calc'd for

C, 71.39; H, 9.58; saponification equivalent, 168.2; iodine number, 301.8. Found: C, 71.93; H, 9.69; saponification equivalent, 164.5; iodine number, 300.4. This latter fraction obtained by this process was hydrogenated and hydrolyzed to yield normal octyl alcohol. This was identified by the melting point and mixed melting point of known derivatives, the p-nitrophenylurethane and the 3,5-dinitrobenzoate. The quantity of pure, linear, diethylenically unsaturated, primary, $C_8$-acetate which was isolated corresponded to 27% of the total $C_8$-acetate fraction or 10% of the total product.

The acetate of this primary, diethylenically unsaturated 8-carbon alcohol was saponified by refluxing in a solution of potassium hydroxide in ethyl alcohol. The alcohol thus obtained boiled at 77°/5.5 mm. pressure and had the following analysis. Calc'd for

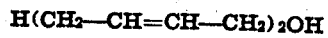

C, 76.14; H, 11.18; iodine number, 402.3. Found: C, 76.39; H, 11.23; iodine number, 376.6, 380.1; $n_D^{25}$ 1.4642.

In another experiment similar to the one described above, the entire product was hydrogenated before distillation. The $C_{12}$-acetate fraction, B. P. 128–148°/1 mm., constituted 10% of the total product.

Analysis calc'd for $H(C_4H_8)_3OCOCH_3$: C, 73.63; H, 12.36, saponification equivalent, 228.4. Found: C, 73.03; H, 11.10; saponification equivalent, 216.4.

The above data show there is formed by the reaction, products which have the structure,

where $n$ is 2 and 3. Higher acetates, in which $n$ is 4 or higher, are obtained as well as minor amounts of the acetates of secondary alcohols. These esters and alcohols, obtainable by the process described, are of particular interest in perfume applications and for further reactions in view of the ethylenic unsaturation they possess.

Example III

To 300 parts of acetic acid which contained 0.1% by weight of perchloric acid (as in Example I acetic anhydride was used in the preparation of the catalyst solution to react with the water present in the perchloric acid solution), 100 parts of isoprene was added. After a reaction time of four hours at 25° C., the mixture was poured into ice water and the acetic acid neutralized with aqueous alkali. The layers were separated and the aqueous layer extracted twice with ether. The extracts and organic layer were combined and dried over calcium chloride. The ether and unreacted isoprene were removed by distillation through a packed column. The still residue was 90.6 parts. The iodine number of the still residue showed it to be unsaturated. The saponification number indicated that the residue consisted of esters having an average of 10 isoprene units. When the above procedure was repeated except that the acetic acid contained 0.1% of sulfuric acid in place of the perchloric acid, the still residue was only 2.0 parts. The still residue consisted of acetates of alcohols having more than one isoprene unit.

Example IV

To 2,000 parts of cooled anhydrous methacrylic acid containing 2% by weight of perchloric acid was added 340 parts of butadiene. After a reaction time of 4 hours at 25° C. the perchloric acid was neutralized by the addition of 230 parts of a saturated solution of potassium acetate in acetic acid. After removing the precipitated potassium perchlorate by filtration, 2 g. of hydroquinone was added and the methacrylic acid was distilled from the reaction mixture under reduced pressure. To the residue was added 860 parts of toluene and the solution was extracted with aqueous sodium bicarbonate to remove acidic materials. The toluene extract was dried over calcium chloride and toluene removed by distillation at 55 mm. pressure. Further distillation of the residue gave the following results:

(1) The first fraction was obtained by distillation at 60–75° C. at 1 mm. pressure and amounted to 29.3 parts. This product had the following analysis: Saponification equivalent, 199.1; iodine number 282.9. Calculated for

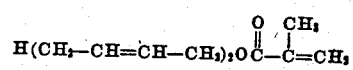

Saponification equivalent, 194.3; iodine number, 261.3.

(2) The second fraction, amounting to 19.5 parts, had a boiling point of 90–110° C. at 1 mm. and had the following analysis: Saponification equivalent, 236.1; iodine number, 238.6. Calculated for the ester having three butenyl residues: Saponification equivalent, 248.4; iodine number, 306.6.

(3) The still residue, which amounted to 253.6 parts, consisted of the methacrylates of higher molecular weight, multiply unsaturated alcohols. Films were obtained by the addition of 0.05% by weight of cobalt naphthenate which after air-drying at room temperature for 20 hours gave tackfree surfaces.

The present invention is generic to the reaction, in the presence of anhydrous perchloric acid, of a carboxylic acid with a hydrogen-containing, conjugated diene having two aliphatic carbon-to-carbon double bonds. In view of the greater reactivity and more ready availability of hydrogen-containing conjugated dienes of four to six carbons, these are preferred. For similar reasons such dienes of four to six carbons wherein the two conjugated double linkages are bonded to terminal carbons, i. e. hydrogen-containing conjugated dienes of four to six carbons and having two terminal methylene ($=CH_2$) groups are preferred. While chloroprene may be employed as may other dienes having halogen, alkoxy, aryloxy, and acyloxy substituents, e. g., 2,3-dichlorobutadiene-1,3, 2,3-dimethoxybutadiene-1,3, 2-phenoxybutadiene-1,3 and 2-acetoxybutadiene-1,3, nevertheless conjugated diene hydrocarbons of four to six carbons such as cyclopentadiene, and particularly those having two terminal methylene groups, are preferred including butadiene, 2-alkylbutadienes, e. g., isoprene, 2,3-dialkylbutadienes, e. g., 2,3-dimethylbutadiene.

In the process of this invention there may be employed any carboxylic acid, preferably one which is liquid at 40° C. and has not more than two carboxyls. Such acids are particularly convenient in the reaction. Particularly preferred are the aliphatic hydrocarbon monocarboxylic acids of 1 to 6 carbons, especially alkanoic acids of the formula $C_nH_{2n+1}COOH$, where $n$ is a cardinal number up to 5, and those acids up to 6 carbons and having an ethylenic double bond conjugated with the carbonyl of the carboxyl group. Illustrative acids which may be employed in the process of this invention are formic, acetic, propionic, isobutyric, butyric, lauric, caproic, trimethylacetic, acrylic, methacrylic, crotonic, beta,-beta-dimethylacrylic, chloroacetic, dichloroacetic, trichloroacetic, trifluoroacetic, alpha-chloroacrylic, oxalic, succinic, glutaric, adipic, pimelic, fumaric, sebacic, maleic, phthalic, terephthalic, benzoic, naphthoic, parachlorobenzoic, alpha-bromophenylacetic, phenoxyacetic, phenylacetic, methoxyacetic, alpha-acetoxypropionic, propiolic, and dihydromuconic acids. Monoesters of dibasic acids, e. g., methyl hydrogen terephthalate and methyl hydrogen adipate, may be employed.

When the acid employed is not a liquid at the temperature of the reaction, a solvent such as nitrobenzene, the lower nitrohydrocarbons, or halogenated hydrocarbons such as chlorobenzene and trichloroethylene may be employed.

The reaction may be carried out at a temperature of −40 to 100° C., although 2C–40° C. is preferred. The time of reaction may be as little as a few minutes, although 2–50 hours usually give sufficient time for reaction. It is to be understood that the time and temperature employed are interdependent variables and also depend upon the specific conjugated diene employed as well as the acid concentration. In general, 0.05–5 parts of conjugated diene are employed per part of carboxylic acid, with 0.0001–0.2 part of perchloric acid per part of carboxylic acid, although optimum results are usually obtained when 0.1–0.5 part of conjugated diene is employed with 0.001–0.05 part of perchloric acid per part of carboxylic acid. (In the above, parts are by weight.) The reaction system should be anhydrous.

The products of this invention have the following formula:

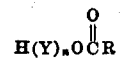

in which Y is a divalent radical having the empirical composition of the diene, $n$ is a plural integer of 2 to 10 and usually 2 to 4, and RCO is an acyl radical. The preferred reaction products of butadiene and an aliphatic hydrocarbon monocarboxylic acid of 1 to 6 carbons have the formula

wherein $n$ is an integer from 2 to 4 or even higher, RCO is the acyl radical of an aliphatic hydrocarbon monocarboxylic acid of 1 to 6 carbons, and —$C_4H_6$— is a butenylene radical.

The products of this invention are useful in many applications but particularly as intermediates. The products obtained from butadiene are useful in perfumes, preparation of drying oils, preparation of unsaturated alcohols and their conversion to saturated alcohols and other applications.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of acetate of $C_{4n}$ alcohols where $n$ is a plural integer which comprises reacting acetic acid under anhydrous conditions with from 0.1 to 0.5 part by weight of butadiene per part of acetic acid in the presence of 0.001 to 0.05 part by weight of perchloric acid per part of acetic acid.

2. A process for the preparation of alkanoic acid esters of $C_{4n}$ alcohols where $n$ is a plural integer which comprises reacting an alkanoic acid of one to six carbons under anhydrous conditions with butadiene in the presence of perchloric acid.

3. A process for the preparation of carboxylic acid esters of $C_{4n}$ alcohols where $n$ is a plural integer which comprises reacting butadiene under anhydrous conditions with a lower unsubstituted aliphatic carboxylic acid which is, apart from carboxyl, aliphatic hydrocarbon, in the presence of perchloric acid.

4. A process for the preparation of esters wherein hydrogen of a carboxyl group is replaced by a monovalent radical containing the components of a plurality of molecules of a conjugated diene hydrocarbon of 4 to 6 carbons and having two terminal methylene groups which comprises reacting said diene under anhydrous conditions with a lower unsubstituted aliphatic carboxylic acid in the presence of perchloric acid.

5. Process of claim 4 wherein the carboxylic acid is an alkanoic acid.

6. Process of claim 4 wherein the carboxylic acid is acetic acid.

7. A process for the preparation of esters wherein hydrogen of a carboxyl group is replaced by a monovalent radical containing the components of a plurality of molecules of a hydrogen-containing conjugated diene of four to six carbons having two aliphatic carbon-to-carbon double bonds and having two terminal methylene groups which comprises reacting said diene under anhydrous conditions with a lower unsubstituted aliphatic carboxylic acid in the presence of perchloric acid.

8. Process of claim 7 wherein the carboxylic acid is an alkanoic acid.

9. Process of claim 7 wherein the carboxylic acid is acetic acid.

10. Acyclic acetates of the formula $$H(C_4H_6)_nO—CO.CH_3$$

where $n$ is a plural integer from 2 to 10 and the —$C_4H_6$— radical is a butenylene radical.

11. Acetates of the formula $$H(C_4H_6)_nO—CO.CH_3$$

where $n$ is two to four and the —$C_4H_6$—radical is a butenylene radical.

12. Acyclic esters of the formula $$H(C_4H_6)_nO.CO.R$$

wherein $n$ is a plural integer from 2 to 10, the —$C_4H_6$— radical is a butenylene radical, and —CO.R is the acyl radical of an alkanoic acid of two to six carbons.

13. Esters of the formula $$H(C_4H_6)_nO.CO.R$$

wherein $n$ is from two to four, the —$C_4H_6$— radical is a butenylene radical and —CO.R is the acyl radical of an alkanoic acid of two to six carbons.

14. An acyclic ester of an unsubstituted aliphatic monocarboxylic acid of two to six carbons having the carboxyl hydrogen replaced by a monovalent radical composed of an atom of hydrogen plus the atoms of a plurality, from 2 to 10, of molecules of butadiene.

15. An acyclic ester of an aliphatic monocarboxylic acid of two to six carbons having the carboxyl hydrogen replaced by a monovalent radical composed of an atom of hydrogen plus the atoms of two to four molecules of butadiene.

16. An acyclic ester of a lower unsubstituted aliphatic carboxylic acid having carboxyl hydrogen replaced by a monovalent radical composed of an atom of hydrogen plus the atoms of a plurality, from 2 to 10, of molecules of butadiene.

17. An acyclic ester of a carboxylic acid having carboxyl hydrogen replaced by a monovalent radical composed of an atom of hydrogen plus the atoms of two to four molecules of butadiene.

18. An acyclic ester of methacrylic acid having the carboxyl hydrogen replaced by a monovalent radical composed of an atom of hydrogen plus the atoms of a plurality, from 2 to 10, of molecules of butadiene.

19. An acyclic ester of methacrylic acid having the carboxyl hydrogen replaced by a monovalent radical composed of an atom of hydrogen plus the atoms of two to four molecules of butadiene.

EDWARD LEVANT JENNER.

REFERENCES CITED

The following references are of record in the file of this patent:

UNITED STATES PATENTS

| Number | Name | Date |
|---|---|---|
| 2,198,046 | Vierling | Apr. 23, 1940 |
| 2,402,137 | Hanford | June 18, 1946 |

FOREIGN PATENTS

| Number | Country | Date |
|---|---|---|
| 252,160 | Germany | Oct. 15, 1912 |

OTHER REFERENCES

Cook et al., Jour. Chem. Soc. (London 1935), I.
Cook et al., Jour. Chem. Soc. (London 1938), 61.